US008674637B2

(12) United States Patent
Kamijo

(10) Patent No.: US 8,674,637 B2
(45) Date of Patent: Mar. 18, 2014

(54) VEHICLE

(75) Inventor: Yusuke Kamijo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 13/497,008

(22) PCT Filed: May 19, 2010

(86) PCT No.: PCT/JP2010/058424
§ 371 (c)(1),
(2), (4) Date: Mar. 19, 2012

(87) PCT Pub. No.: WO2011/145184
PCT Pub. Date: Nov. 24, 2011

(65) Prior Publication Data
US 2012/0175948 A1 Jul. 12, 2012

(51) Int. Cl.
*H02P 6/06* (2006.01)
(52) U.S. Cl.
USPC ............. 318/400.3; 318/139; 318/400.08; 180/65.1; 180/65.21
(58) Field of Classification Search
USPC ............ 318/400.3, 139, 400.08; 180/65.1, 180/65.21
See application file for complete search history.

(56) References Cited

U.S. PATENT DOCUMENTS

| | | | | |
|---|---|---|---|---|
| 5,719,487 | A | * | 2/1998 | Sato et al. .......... 322/28 |
| 5,731,689 | A | * | 3/1998 | Sato ................ 322/25 |
| 6,236,172 | B1 | | 5/2001 | Obara et al. |
| 8,040,083 | B2 | * | 10/2011 | Okamura et al. ........ 318/139 |
| 2009/0200993 | A1 | * | 8/2009 | Maeda ................ 322/99 |
| 2009/0237019 | A1 | * | 9/2009 | Yamakawa et al. ...... 318/400.09 |
| 2009/0248230 | A1 | * | 10/2009 | Izumi et al. ............ 701/22 |
| 2009/0279337 | A1 | * | 11/2009 | Hamatani ............. 363/132 |
| 2010/0045103 | A1 | * | 2/2010 | Mitsutani ............. 307/9.1 |
| 2010/0085019 | A1 | | 4/2010 | Masuda |

FOREIGN PATENT DOCUMENTS

| | | |
|---|---|---|
| JP | A-2006-025493 | 1/2006 |
| JP | A-2006-149064 | 6/2006 |
| JP | A-2008-017682 | 1/2008 |
| JP | A-2009-081959 | 4/2009 |
| JP | A-2009-201200 | 9/2009 |
| JP | A-2009-227080 | 10/2009 |
| JP | A-2010-093871 | 4/2010 |

OTHER PUBLICATIONS

International Search Report issued in International Application No. PCT/JP2010/058424 dated Jun. 15, 2010.

* cited by examiner

*Primary Examiner* — Erick Glass
(74) *Attorney, Agent, or Firm* — Oliff PLC

(57) ABSTRACT

A vehicle includes a power storage device, a motor generator, a converter for stepping up an output voltage from the power storage device, an inverter for driving the motor generator, and an ECU. The inverter includes switching elements. The switching elements have a characteristic that the withstand voltage of the switching elements decreases as the temperature of the inverter decreases. The ECU sets the stepped-up voltage, based on a temperature characteristic of the power storage device and a temperature characteristic of the inverter, so that the stepped-up voltage is increased within a range in which the stepped-up voltage does not exceed the withstand voltage. In this way, at low temperatures, deterioration of the power performance can be suppressed while the switching elements are protected.

9 Claims, 13 Drawing Sheets

VEHICLE

TECHNICAL FIELD

The present invention relates to vehicles, and more particularly to motor drive control for a vehicle capable of generating a drive force by a motor using electric power from a power storage device.

BACKGROUND ART

Vehicles of recent interest as environmentally-friendly vehicles are those equipped with a power storage device (such as secondary battery or capacitor for example) and caused to travel by a drive force that is generated by a motor using electric power stored in the power storage device. Such vehicles include for example electric vehicles, hybrid vehicles, fuel cell vehicles, and the like.

In these vehicles, electric power conversion devices such as converter and inverter may be used for driving the motor. In some cases, it may become necessary to restrict the output of the motor for the sake of parts protection, based on the temperature characteristics of these power conversion devices and the temperature characteristics of the power storage device.

Japanese Patent Laying-Open No. 2006-149064 (PTL 1) discloses a configuration of a vehicle drive system driven by an inverter. Specifically, a torque command value for a rotating electric machine is restricted in the case where the temperature of a coolant for cooling the inverter is close to the temperature of the inverter. The vehicle drive system disclosed in Japanese Patent Laying-Open No. 2006-149064 (PTL 1) can provide a vehicle having improved compatibility of system protection at high temperatures with power performance or fuel efficiency.

CITATION LIST

Patent Literature

PTL 1: Japanese Patent Laying-Open No. 2006-149064
PTL 2: Japanese Patent Laying-Open No. 2009-201200
PTL 3: Japanese Patent Laying-Open No. 2009-081959
PTL 4: Japanese Patent Laying-Open No. 2006-025493

SUMMARY OF INVENTION

Technical Problem

In general, switching elements included in the power conversion device have a characteristic that their temperature decrease is accompanied by deterioration of their withstand voltage. Therefore, in the case where such a power conversion device is driven under a condition that the temperature is extremely low like cold districts, it may be necessary to restrict the voltage applied to the switching elements, in order to prevent damage to the switching elements.

When the voltage is thus restricted, the torque that can be output by the rotating electric machine is also restricted, resulting in a problem of deterioration of the power performance.

The present invention has been made to solve this problem, and an object of the present invention is, for a vehicle capable of generating a drive force by a motor using electric power from a power storage device, to suppress deterioration of the power performance while protecting the parts under low-temperature conditions.

Solution to Problem

A vehicle according to the present invention includes a power storage device, a rotating electric machine, a converter for stepping up an output voltage from the power storage device, an inverter, and a control device. The inverter includes a switching element for converting the stepped-up voltage from the converter to drive the rotating electric machine. The control device sets the stepped-up voltage. The switching element has a characteristic that a withstand voltage of the switching element decreases as a temperature of the inverter decreases. The control device sets the stepped-up voltage, based on a temperature characteristic of the power storage device and a temperature characteristic of the inverter, so that the stepped-up voltage is increased within a range in which the stepped-up voltage does not exceed the withstand voltage.

Preferably, the control device sets the stepped-up voltage, based on a temperature of the power storage device, a temperature of the inverter, a target torque command value for the rotating electric machine, and a maximum rotational speed of the rotating electric machine.

Preferably, the control device sets the stepped-up voltage, based on the temperature of the power storage device and the temperature of the inverter, by further restricting an upper limit of charge and discharge electric power of the power storage device, so that the maximum rotational speed is achieved for the target torque command value.

Preferably, when the stepped-up voltage enables the maximum rotational speed to be achieved for the target torque command value, the control device calculates chargeable and dischargeable electric power of the power storage device, based on a maximum current allowed to flow in the inverter at a current temperature of the inverter. When a maximum electric power that can be input and output to and from the power storage device at a current temperature of the power storage device is larger than the chargeable and dischargeable electric power, the control device sets the chargeable and dischargeable electric power to the upper limit of charge and discharge electric power and, when the maximum electric power is smaller than the chargeable and dischargeable electric power, the control device sets the maximum electric power to the upper limit of charge and discharge electric power.

Preferably, the control device sets the stepped-up voltage based on a maximum current that can be input and output to and from the power storage device at a current temperature of the power storage device and a temperature of the inverter.

Preferably, the control device sets the stepped-up voltage to a maximum stepped-up voltage that enables an inverter current corresponding to the maximum current to flow at a current temperature of the inverter.

Preferably, the control device sets the stepped-up voltage based on a temperature of the power storage device, a temperature of the inverter, and a target electric power required by the rotating electric machine.

Preferably, the control device compares the target electric power with a maximum electric power that can be input and output to and from the power storage device at a current temperature of the power storage device. When the target electric power is larger than the maximum electric power, the control device sets the stepped-up voltage based on a maximum current that can be input and output to and from the power storage device when the maximum electric power is input and output to and from the power storage device and based on a temperature of the inverter and, when the target electric power is smaller than the maximum electric power, the control device sets the stepped-up voltage based on the target electric power and a temperature of the inverter.

Preferably, when the target electric power is larger than the maximum electric power, the control device sets the stepped-up voltage to a maximum stepped-up voltage that enables an inverter current corresponding to the maximum current to flow at a current temperature of the inverter and, when the target electric power is smaller than the maximum electric power, the control device sets the stepped-up voltage to a maximum stepped-up voltage that enables current, which flows in the inverter when the target electric power is input or output at a current temperature of the inverter, to flow.

Preferably, the temperature characteristic of the power storage device includes a characteristic that a maximum current that the power storage device can output decreases as the temperature of the power storage device decreases.

Preferably, the temperature characteristic of the inverter includes a characteristic that current allowed to flow in the inverter is larger as the temperature of the inverter is higher and is smaller as the stepped-up voltage is larger.

Advantageous Effects of Invention

For a vehicle capable of generating a drive force by a motor using electric power from a power storage device, the present invention can suppress deterioration of the power performance while protecting the parts under low-temperature conditions.

DESCRIPTION OF EMBODIMENTS

Figure 1:
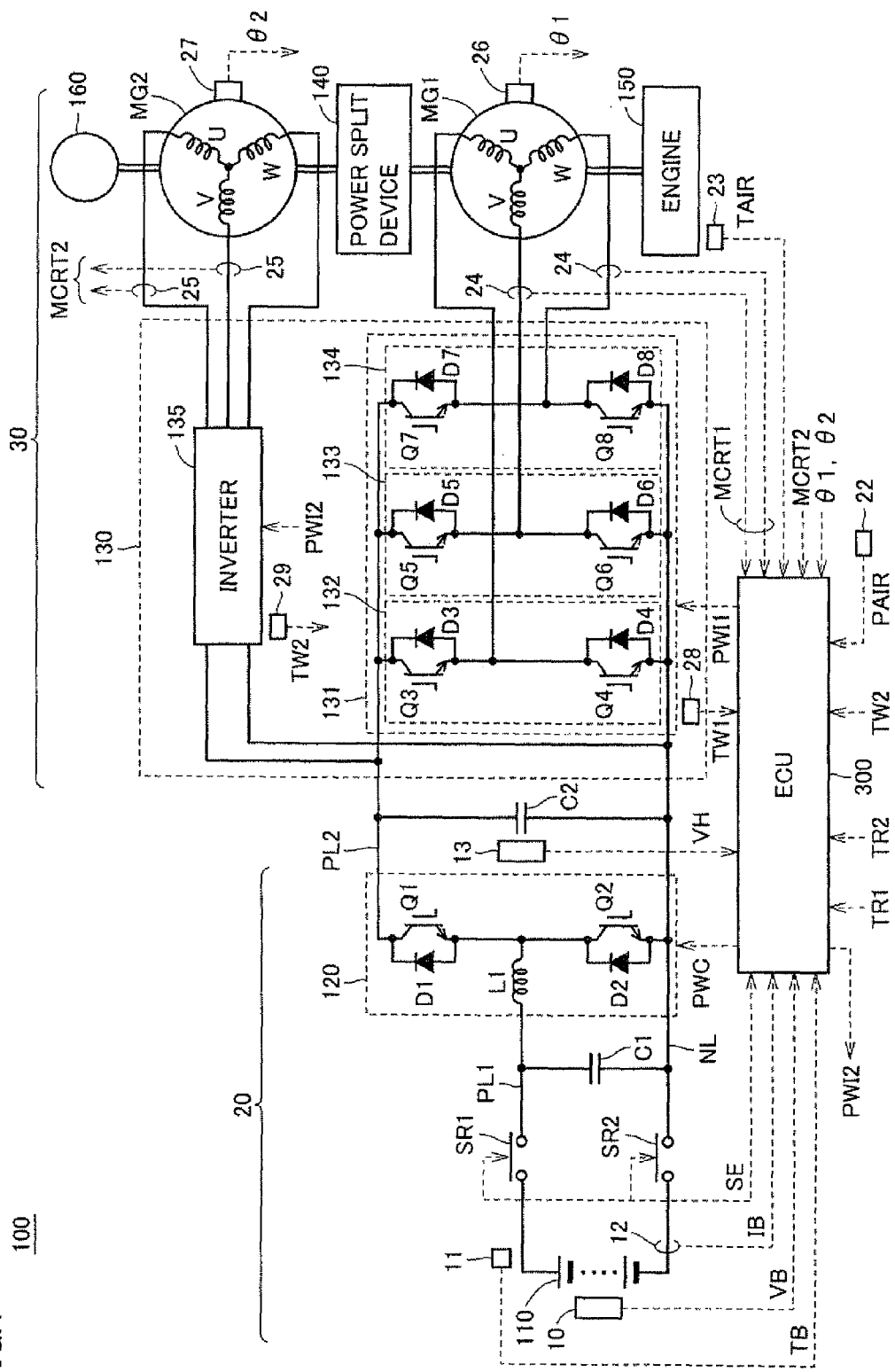
FIG. 1 is an entire configuration diagram of a vehicle equipped with a motor drive control system according to an embodiment.

In the following, embodiments of the present invention will be described in detail with reference to the drawings. In the drawings, the same or corresponding components are denoted by the same reference characters, and a description thereof will not be repeated.

[Basic Configuration of Vehicle]

FIG. 1 is an entire configuration diagram of a vehicle 100 mounted with a motor drive control system according to an embodiment. In connection with the present embodiment, a hybrid vehicle mounted with an engine and motor generators will be described as vehicle 100 by way of example. The configuration of vehicle 100, however, is not limited to this, and the embodiment is applicable to any vehicle as long as the vehicle is capable of traveling using electric power from a power storage device. Vehicle 100 includes vehicles such as electric vehicle and fuel cell vehicle besides the hybrid vehicle.

Referring to FIG. 1, vehicle 100 includes a DC voltage generation unit 20, a load device 30, a capacitor C2, and a control device (hereinafter also referred to as ECU (Electronic Control Unit)) 300.

DC voltage generation unit 20 includes a power storage device 110, system relays SR1, SR2, a capacitor C1, and a converter 120.

Power storage device 110 is typically configured to include a secondary battery such as nickel-metal hydride battery or lithium ion battery, or a power storage device such as electric double layer capacitor. Voltage VB, current IB, and temperature TB of power storage device 110 are detected by a voltage sensor 10, a current sensor 12, and a temperature sensor 11, respectively. Detected voltage VB, current TB, and temperature TB are output to ECU 300.

System relay SR1 has one end connected to a positive terminal of power storage device 110 and the other end connected to an electric power line PL1. System relay SR2 has one end connected to a negative terminal of power storage device 110 and the other end connected to a ground line NL. System relays SR1, SR2 are controlled by a signal SE from ECU 300, and switch supply to cut-off or cut-off to supply of electric power between power storage device 110 and converter 120.

Converter 120 includes a reactor L1, switching elements Q1, Q2, and diodes D1, D2. Switching elements Q1 and Q2 are connected in series between an electric power line PL2 and ground line NL which connect converter 120 and inverter 130 to each other. Switching elements Q1 and Q2 are controlled by a control signal PWC from ECU 300.

In the present embodiment, IGBT (Insulated Gate Bipolar Transistor), power MOS (Metal Oxide Semiconductor) transistor, or power bipolar transistor or the like may be used as the switching element. To switching elements Q1, Q2, diodes D1, D2 are connected in antiparallel, respectively. Reactor L1 is connected between a connection node which connects switching elements Q1 and Q2, and electric power line PL1. Capacitor C2 is connected between electric power line PL2 and ground line NL.

Converter 120 is basically controlled so that switching elements Q1 and Q2 are complementarily and alternately rendered ON and OFF in each switching period. When converter 120 performs a voltage step-up operation, it steps up voltage VB supplied from power storage device 110 to a voltage VH (this DC voltage corresponding to an input voltage to an inverter 131 will also be referred to as "system voltage" hereinafter). This voltage step-up operation is carried out by supplying an electromagnetic energy accumulated at reactor L1 in an ON period of switching element Q2 to electric power line PL2 via switching element Q1 and antiparallel diode D1.

When converter 120 performs a voltage step-down operation, it steps down voltage VH to voltage VB. This voltage step-down operation is carried out by supplying an electromagnetic energy accumulated at reactor L1 in an ON period of switching element Q1 to ground line NL via switching element Q2 and antiparallel diode D2.

The voltage conversion ratio (ratio between VH and VB) of these voltage step-up operation and voltage step-down operation is controlled by the ON period ratio (duty cycle) of switching elements Q1, Q2 to the above-described switching period. Switching elements Q1 and Q2 may also be fixed in ON and OFF states respectively to satisfy VH=VB (voltage conversion ratio=1.0).

Capacitor C2 smoothes the DC voltage from converter 120 and supplies the smoothed DC voltage to inverter 130. A voltage sensor 13 detects the voltage across capacitor C2, namely system voltage VH, and outputs the detected value to ECU 300.

Load device 30 includes inverter 130, a power split device 140, an engine 150, drive wheels 160, and motor generators MG1, MG2. Inverter 130 includes inverter 131 for driving motor generator MG1 and an inverter 135 for driving motor generator MG2. While FIG. 1 shows an example where vehicle 100 includes two sets of inverters and motor generators, it may also be configured to include for example only one of a set of inverter 131 and motor generator MG1 and a set of inverter 135 and motor generator MG2.

Motor generators MG1, MG2 receive AC power supplied from inverter 130 to generate a rotational drive force for causing vehicle 100 to travel. Motor generators MG1, MG2 also receive an externally supplied rotational force to generate AC power in response to a regenerative torque command from ECU 300, and generate a regenerative brake force.

Further, motor generators MG1, MG2 are also connected to engine 150 via power split device 140. Motor generators MG1, MG2 and engine 150 are controlled so that an optimum ratio is achieved between the drive force generated by engine 150 and the drive force generated by motor generators MG1, MG2. Here, one of motor generators MG1, MG2 may be configured to function solely as an electric motor, and the other motor generator may be configured to function solely as an electric generator. In the present embodiment, motor generator MG1 is configured to function as an electric generator driven by engine 150, and motor generator MG2 is configured to function as an electric motor for driving drive wheels 160.

Power split device 140 is configured to include a planetary gear train (planetary gears) for example for distributing the motive power of engine 150 to both drive wheels 160 and motor generator MG1.

Inverter 131 receives a stepped-up voltage from converter 120 and drives motor generator MG1 in order to, for example, start engine 150. Inverter 131 also converts regenerative electric power which is generated by motor generator MG1 from mechanical power transmitted from engine 150, and outputs the converted power to converter 120. At this time, converter 120 is controlled by ECU 300 so that the converter operates as a voltage step-down circuit.

Inverter 131 is configured to include a U phase upper-lower arm 132, a V phase upper-lower arm 133, and a W phase upper-lower arm 134 that are provided in parallel between electric power line PL2 and ground line NL. The upper-lower arm of each phase is configured to include switching elements connected in series between electric power line PL2 and ground line NL. Specifically, U phase upper-lower arm 132 is configured to include switching elements Q3, Q4, V phase upper-lower arm 133 is configured to include switching elements Q5, Q6, and W phase upper-lower arm 134 is configured to include switching elements Q7, Q8. To switching elements Q3 to Q8, diodes D3 to D8 are connected in antiparallel, respectively. Switching elements Q3 to Q8 are controlled by a control signal PWI1 from ECU 300.

Typically, motor generator MG1 is a three-phase permanent-magnet synchronous motor. Each of the three coils of U, V, and W phases has one end connected commonly to a neutral point. Further, each phase coil has the other end connected to a connection node between the switching elements of a corresponding one of upper-lower arms 132 to 134 of respective phases.

Inverter 135 is connected to converter 120 in parallel with inverter 131. Inverter 135 converts a DC voltage which is output from converter 120 into a three-phase AC, and outputs the resultant AC to motor generator MG2 which drives drive wheels 160. Inverter 135 also outputs to converter 120 regenerative electric power which is generated by motor generator MG2 through regenerative braking. The internal configuration (not shown) of inverter 135 is similar to that of inverter 131, and the detailed description thereof will not be repeated.

In the case where a torque command value for motor generator MG1 is positive (TR1>0) and a DC voltage is supplied from capacitor C2, inverter 131 converts the DC voltage into an AC voltage by means of switching operations of switching elements Q3 to Q8 in response to control signal PWI1 from ECU 300 to drive motor generator MG1 so that the motor generator outputs a positive torque. In the case where a torque command value for motor generator MG1 is zero (TR1=0), inverter 131 drives motor generator MG1 so that the output torque is zero, by means of the switching operations in response to control signal PWI1. In this way, motor generator MG1 is driven to generate zero or positive torque specified by torque command value TR1.

Further, when vehicle 100 is regeneratively braked, torque command value TR1 for motor generator MG1 is set to a negative value (TR1<0). In this case, inverter 131 converts an AC voltage generated by motor generator MG1 into a DC voltage by the switching operations in response to control signal PWI1, and supplies the DC voltage (system voltage) generated by the conversion to converter 120 via capacitor C2. Regenerative braking herein includes braking which is effected in response to manipulation of a foot brake by a driver who drives the electrically powered vehicle and by which electric power is regeneratively generated, as well as deceleration (or stoppage of acceleration) of the vehicle which is effected by release of the accelerator pedal without manipulation of the foot brake while the vehicle is traveling and by which electric power is regeneratively generated.

Inverter 131 is provided with a temperature sensor 28 for detecting the temperature state of inverter 131. Temperature sensor 28 outputs the detected value of temperature TW1 of inverter 131 to ECU 300. Temperature sensor 28 is placed at a position where the temperature state of inverter 131 can appropriately be detected. For example, temperature sensor 28 may be placed so that it contacts the housing of inverter 131, or placed in the vicinity of the internal switching elements. Alternatively, in the case where a cooling device (not shown) for cooling inverter 131 is provided, the temperature of a cooling medium such as coolant may be detected.

Similarly, inverter 135 receives from ECU 300 a control signal PWI2 in accordance with a torque command value TR2 for motor generator MG2, and performs a switching operation in response to control signal PWI2 to convert a DC voltage into an AC voltage and drive motor generator MG2 so that a predetermined torque is generated. Like inverter 131, inverter 135 is also provided with a temperature sensor 29. Temperature sensor 29 detects temperature TW2 of inverter 135 and outputs the detected value to ECU 300.

Current sensors 24, 25 detect motor currents MCRT1, MCRT2 flowing in motor generators MG1, MG2 respectively, and output respective detected motor currents to ECU 300. Since the sum of respective instantaneous values of the U phase current, the V phase current, and the W phase current is zero, it is sufficient that current sensors 24, 25 are arranged to detect motor currents of two phases as shown in FIG. 1.

Rotational angle sensors (resolvers) 26, 27 detect rotational angles θ1, θ2 of motor generators MG1, MG2, and output respective detected rotational angles θ1, θ2 to ECU 300. Based on rotational angles θ1, θ2, ECU 300 can calculate rotational speeds MRN1, MRN2 and angular velocities ω1, ω2 (rad/s) of motor generators MG1, MG2. Rotational angle sensors 26, 27 may not be arranged. Namely, ECU 300 may directly calculate rotational angles θ1, θ2 from the motor voltage or current.

ECU 300 includes a CPU (Central Processing Unit), a storage device, and an input/output buffer (they are not shown), and controls each of the devices of vehicle 100. Control of them is not limited to processing by software and may be carried out by dedicated hardware (electronic circuitry).

A typical function of ECU 300 is as follows. Based on input torque command values TR1, TR2, DC voltage VB detected by voltage sensor 10, current IB detected by current sensor 12, system voltage VH detected by voltage sensor 13, motor currents MCRT1, MCRT2 from current sensors 24, 25, and rotational angles θ1, θ2 from rotational angle sensors 26, 27 for example, ECU 300 controls the operations of converter 120 and inverter 130 so that motor generators MG1, MG2 output respective torques in accordance with torque command values TR1, TR2. Specifically, ECU 300 generates control signals PWC, PWI1, PWI2 for controlling converter 120 and inverter 130 in the above-described manner, and outputs PWC to converter 120 and PWI1, PWI2 to inverter 130.

When converter 120 performs a voltage step-up operation, ECU 300 performs feedback control on system voltage VH, and generates control signal PWC so that system voltage VH is equal to a voltage command value.

When vehicle 100 operates in a regenerative braking mode, ECU 300 generates control signals PWI1, PWI2 and outputs them to inverter 130 so that an AC voltage generated by motor generators MG1, MG2 is converted into a DC voltage. Thus, inverter 130 converts the AC voltage generated by motor generators MG1, MG2 into a DC voltage and supplies it to converter 120.

Further, when vehicle 100 operates in the regenerative braking mode, ECU 300 also generates control signal PWC and outputs it to converter 120 so that the DC voltage supplied from inverter 130 is stepped down. In this way, the AC voltage generated by motor generators MG1, MG2 is converted into a DC voltage and further stepped down to be supplied to power storage device 110.

ECU 300 receives intake air temperature TAIR detected by a temperature sensor 23 provided for engine 150. ECU 300 also receives detected value PAIR of the atmospheric pressure detected by an atmospheric pressure sensor 22. In consideration of the information about them, ECU 300 generates torque command values TR1, TR2.

[Problem with Voltage Restriction at Low Temperatures]

Next, with reference to FIGS. 2 to 4, a description will be given of a problem with the case where the temperature is low and the system voltage of a vehicle having the converter and inverter as shown in FIG. 1 is restricted for the sake of protecting the switching elements.

Figure 2:
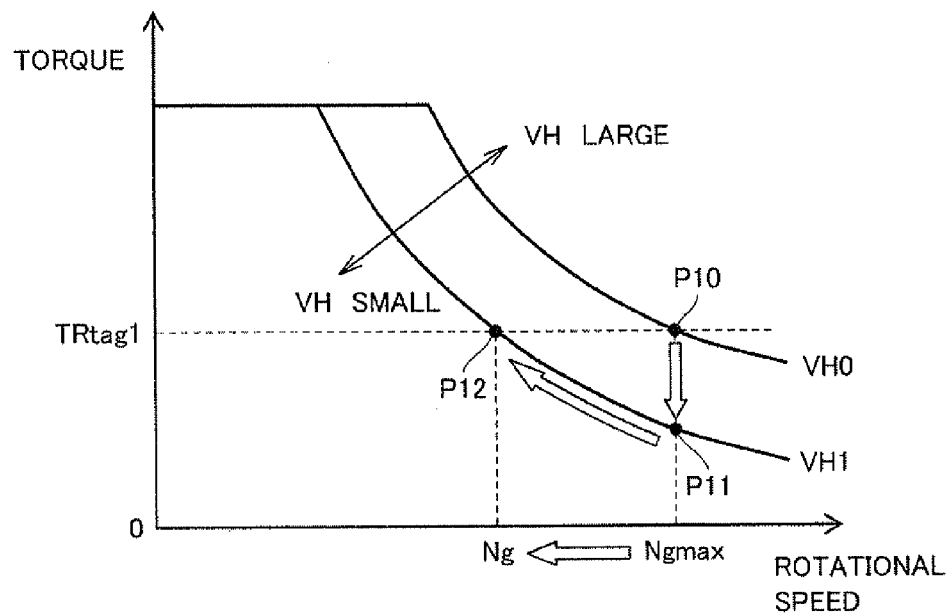
FIG. 2 is a diagram showing a relation between the output torque and the rotational speed of a motor generator.

FIG. 2 is a diagram showing a relation between the output torque and the rotational speed of a motor generator. In the following description, for the purpose of facilitating understanding, the electric power and current of the motor generator and inverter in a power-running mode are expressed by positive values, and the electric power and current of the motor generator and inverter in a regenerative braking mode are expressed by negative values. Regarding the power storage device, the discharge electric power and current are expressed by positive values, and the charge electric power and current are expressed by negative values.

Referring to FIG. 2, a case is considered where the inverter is at ordinary temperature, the mechanically-determined maximum rotational speed of the motor generator is Ngmax, and the system voltage that enables a torque command value TRtag1 for the motor generator to be achieved under this condition is V110 (point P10 in FIG. 2).

Here, at low temperatures such as those in winter and cold districts, the withstand voltage of the switching elements of the inverter decreases as the temperature decreases as described above, and therefore, the system voltage is restricted for example to VH1. Accordingly, the torque that can be output when the rotational speed is maximum rotational speed Ngmax decreases as indicated by a point P11 in FIG. 2. In order to achieve required torque command value TRtag1, it is necessary to reduce the rotational speed (to a point P12 in FIG. 2) along the line of system voltage VH1.

Thus, when the temperature is low and system voltage VH is restricted as described above, the output torque decreases if the rotational speed is maintained, while the rotational speed is limited if the output torque is maintained. Consequently, the power performance could be deteriorated. Particularly in the case of the hybrid vehicle having an engine as shown in FIG. 1, the decrease of the rotational speed of the motor generator could be accompanied by a decrease of the rotational speed of the engine as well. In general, for the hybrid vehicle, the influence of a decreased torque due to the engine's decreased rotational speed is relatively larger than that of the decreased torque due to the decreased system voltage. Therefore, such a restricted rotational speed could further deteriorate the power performance. This influence is likely to be significant particularly on a vehicle of a smaller output like the compact car.

In view of the above, in order to suppress deterioration of the power performance at low temperatures, it is desirable to restrict system voltage VH as little as possible. In order to protect the switching elements, however, restriction of system voltage VH is still necessary as described above. It is therefore required to set the system voltage appropriately so that both purposes are accomplished.

Here, a comparative example will be described of how to set system voltage VH in the case where the present embodiment is not applied.

Figure 3:
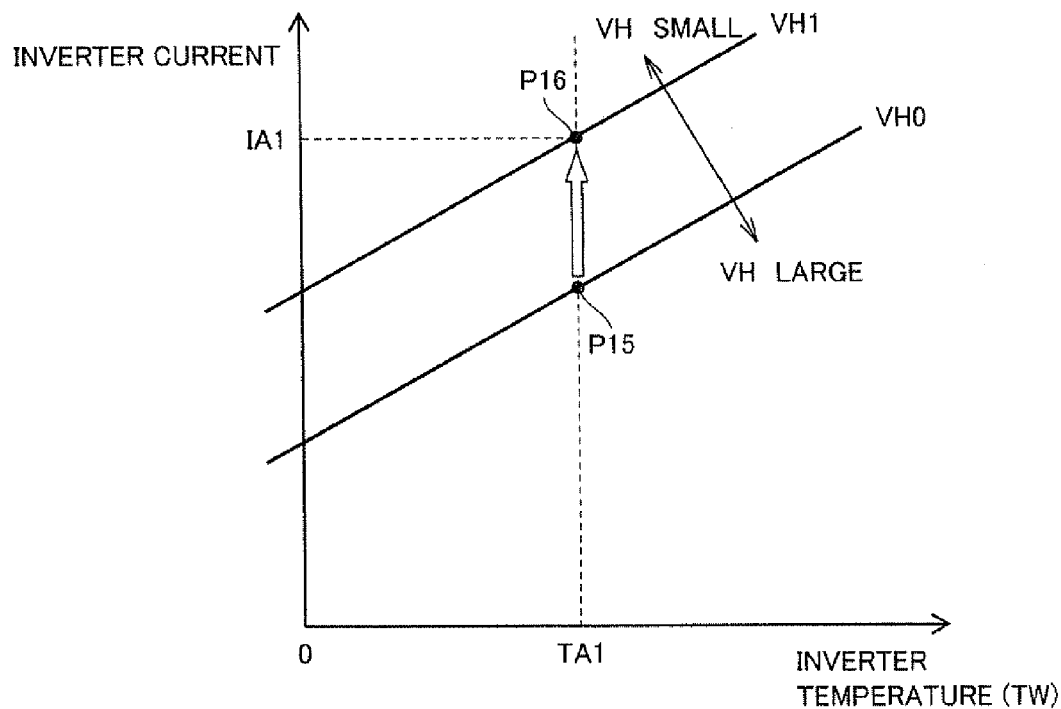
FIG. 3 is a diagram for illustrating a relation between the inverter temperature and the current allowed to flow in the inverter.

FIG. 3 is a diagram for illustrating a relation between inverter temperature TW and the current allowed to flow in the inverter. Referring to FIG. 3, when system voltage VH is constant, generally the current allowed to flow in the inverter increases as inverter temperature TW increases.

When inverter temperature TW is constant, the current allowed to flow in the inverter increases as system voltage VH decreases, since a smaller system voltage causes a smaller surge component of the current that is generated due to a voltage variation.

As seen from FIG. 3, at a certain temperature TA1 of the inverter, system voltage VH1 for changing the state of a point P15 in FIG. 3 to the state of a point P16 in FIG. 3 is determined depending on how much current is to be allowed to flow in the inverter. The magnitude of the current flowing in the inverter has a value that is substantially proportional to the magnitude of the current fed from the power storage device. Thus, system voltage VH1 is determined depending on the magnitude of the current fed from the power storage device.

Figure 4:
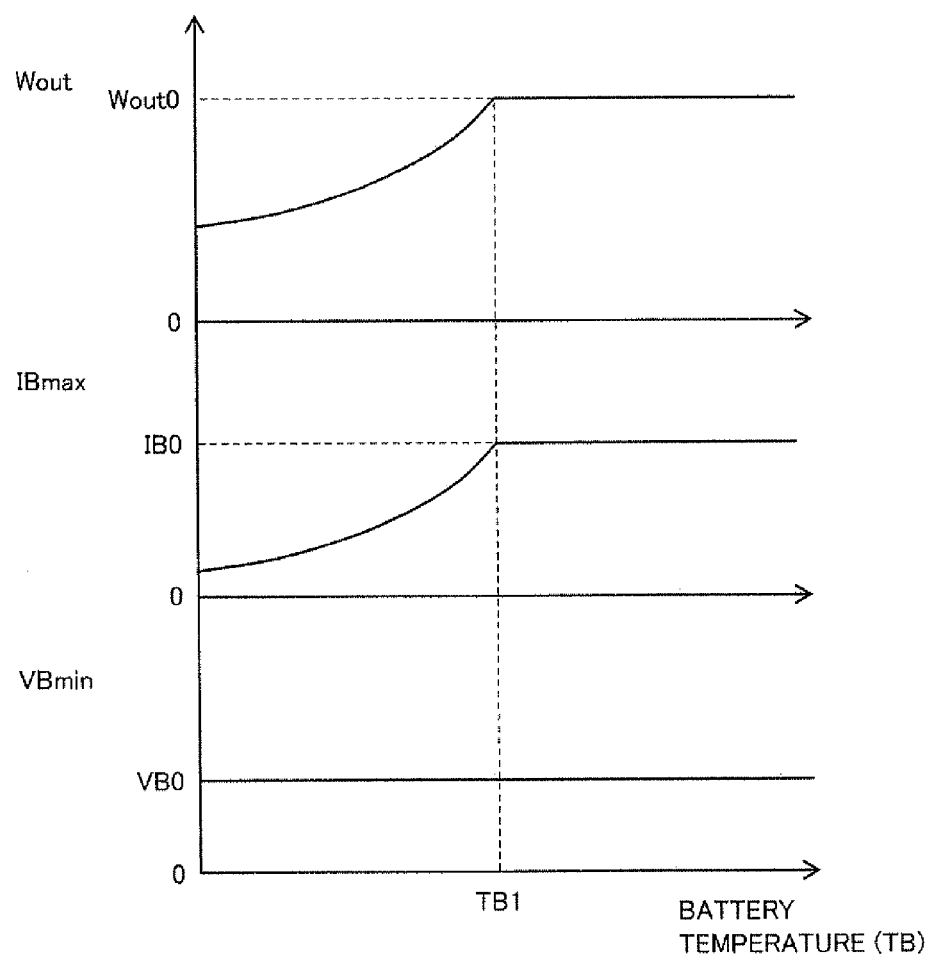
FIG. 4 is a diagram showing an example of temperature characteristics of a common power storage device.

FIG. 4 is a diagram showing an example of the temperature characteristics of a common power storage device. For the power storage device, an upper limit Wout of the discharge power is set as shown in FIG. 4 for preventing overdischarge. Regarding this upper limit Wout of the discharge power, as temperature TB of the power storage device becomes smaller than a certain threshold value TB1 and accordingly the internal resistance of the cells in the power storage device increases, the electric power that can be output from the power storage device decreases from a maximum value Wout0.

As for a lower limit VBmin of the voltage that is output from each cell in the power storage device, generally this lower limit does not depend on the temperature for the sake of preventing degradation of the cells, but is set to a constant value VB0 for example. Therefore, a maximum current IBmax that can be output from the power storage device has a value proportional to upper limit Wout of the discharge power.

In this comparative example, however, the system voltage is set to the reduced system voltage VH1 without giving consideration to temperature TB of the power storage device. Specifically, the system voltage is set to VH1 under the precondition that maximum current IBmax that can be output from the power storage device has a maximum value IB0 regardless of temperature TB of the power storage device, namely the upper limit of the discharge power is Wout0.

In this case, if temperature TB of the power storage device is lower than threshold value TB1 in FIG. 4 and maximum current IBmax is smaller than maximum value IB0 for example, system voltage VH could be restricted excessively to cause the power performance to be deteriorated to more than an inevitable extent.

Accordingly, in the present embodiment, voltage-setting control is performed at low temperatures in such a manner that system voltage VH is set in consideration of the temperature of the power storage device in addition to the temperature of the inverter.

In this way, excessive restriction of system voltage VH can be avoided and thus improved power performance can be expected while the switching elements are protected.

First Embodiment

In the above comparative example, when system voltage VH is to be restricted, the system voltage is set to a smaller system voltage under the precondition that, when a maximum current that can be output by the power storage device flows, the inverter allows the current to flow therein that is supplied to the inverter according to the maximum current.

A case will now be considered in which, for the same temperature of the inverter, restriction of system voltage VH is relaxed so that the decrease of system voltage VH is smaller. As shown in FIG. 3 described above, under the same inverter temperature condition, a larger system voltage provides a smaller current that is allowed to flow in the inverter. In other words, the current that is output from the power storage device can be reduced to decrease the current flowing in the inverter and thereby reduce the decrease of system voltage VH.

Further, as shown in FIG. 4, upper limit Wout of the discharge power of the power storage device is proportional to maximum current IBmax that can be output by the power storage device. Therefore, in the case where the required electric power output that is calculated from the required torque command and rotational speed at a current temperature TB of the power storage device is smaller than upper limit Wout of the discharge power, the output current from the power storage device is smaller than IB0. Thus, the electric power that can be discharged from the power storage device can be restricted to thereby reduce the maximum current that can be output from the power storage device.

In this way, the discharge power of the power storage device can be restricted to thereby reduce the decrease of system voltage VH. Consequently, the rotational speed can be prevented from being limited and therefore deterioration of the power performance can be expected to be suppressed.

Next, with reference to FIGS. 5 to 7, the above-described voltage-setting control in the first embodiment will be described in more detail.

Figure 5:
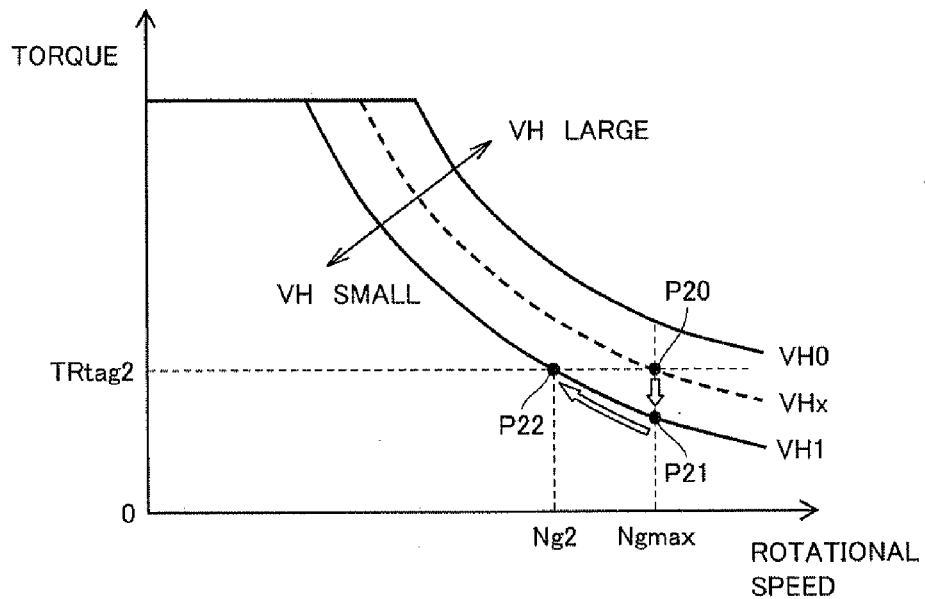
FIG. 5 is a first diagram for illustrating voltage-setting control in a first embodiment.

Referring to FIG. 5, a case will be considered where the torque command value that is required through driver's operation of the accelerator pedal for example is TRtag2. It is supposed that, when the torque command value is TRtag2, maximum rotational speed Ngmax can be achieved by the state indicated by a point P20 in FIG. 5 and a minimum system voltage that enables this state is VHx (VHx>VH1). In the case where the system voltage is this VHx, as long as the discharge power that must be output from the power storage device does not exceed upper limit Wout of the discharge power, reduction of the system voltage to VH1 like the comparative example does not cause the rotational speed to be limited (to the state of a point 22 in FIG. 5).

Figure 6:
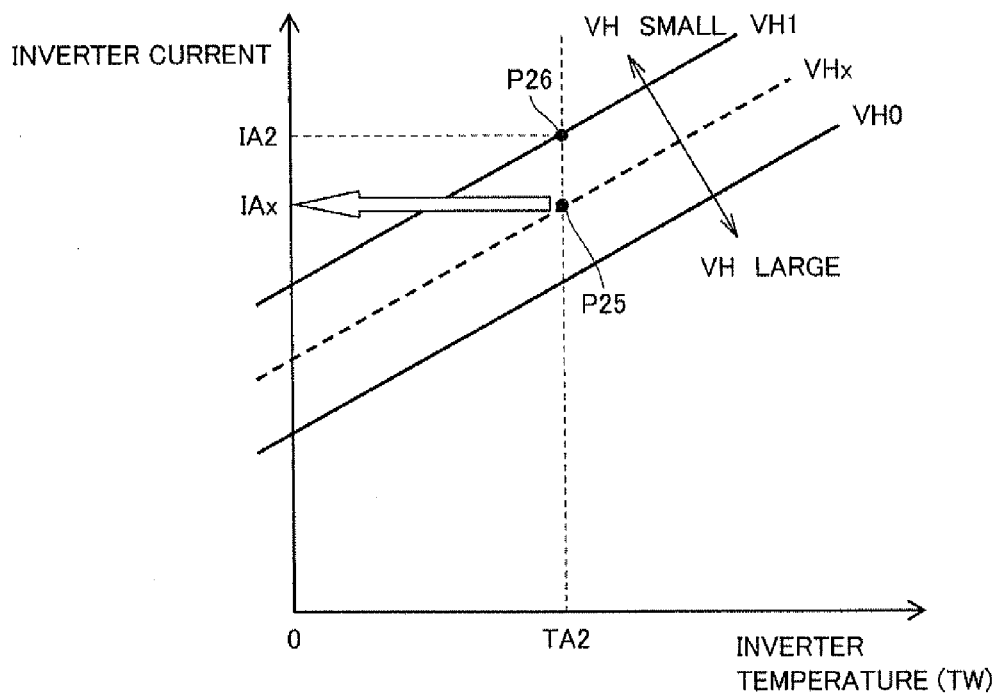
FIG. 6 is a second diagram for illustrating voltage-setting control in the first embodiment.

Referring next to FIG. 6, current IAx is calculated that is allowed to flow in the inverter when the current inverter temperature is TA2 and the system voltage is VHx. Here, since VHx>VH1 is met, this inverter current TAx is smaller than current IA2 when the system voltage is reduced to VH1.

Figure 7:
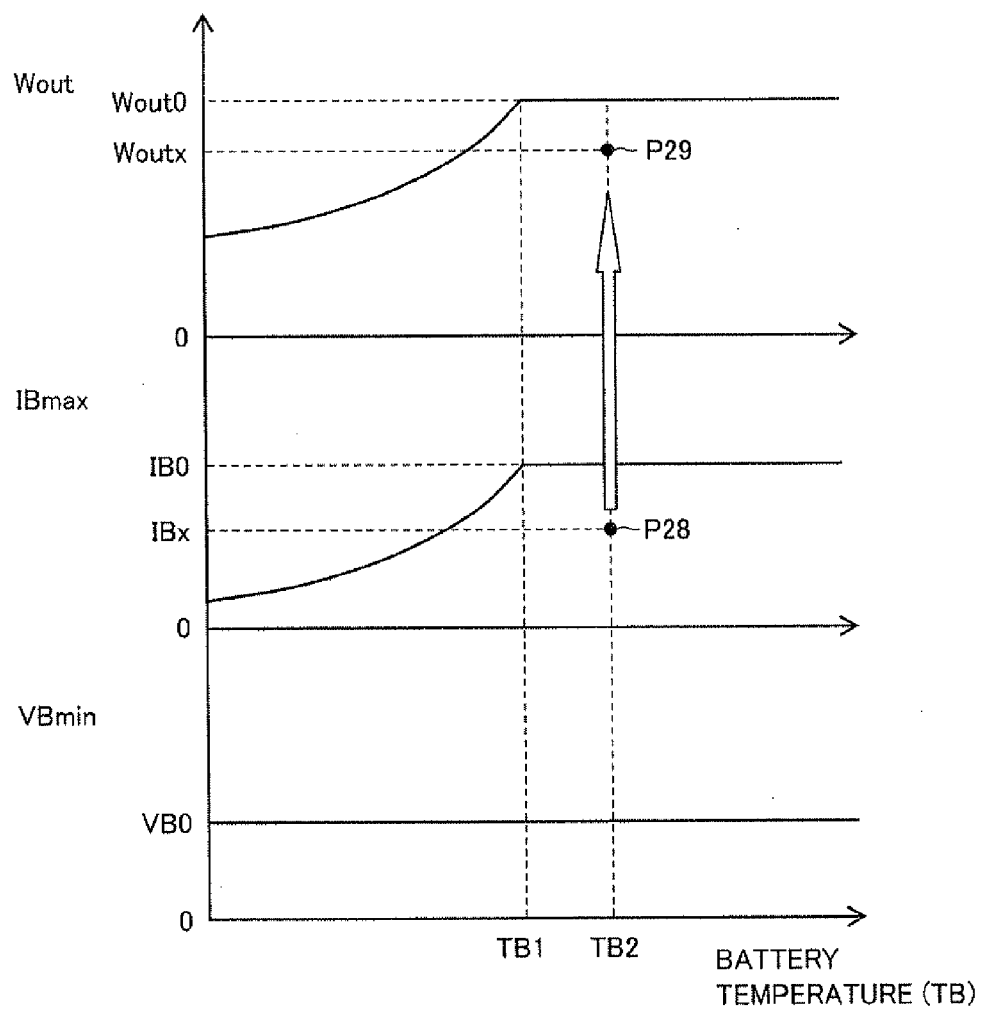
FIG. 7 is a third diagram for illustrating voltage-setting control in the first embodiment.

Referring then to FIG. 7, it is determined whether or not output current IBx of the power storage device that corresponds to inverter current IAx calculated in FIG. 6, when the current temperature of the power storage device is TB2, is smaller than maximum current IBmax that can be output at this temperature TB2. For example, in the case as shown in FIG. 7 where output current IBx of the power storage device is located at a point P28 in FIG. 7 when the temperature of the power storage device is TB2, the output current of the power storage device is smaller than maximum current IB0. Therefore, discharge power Woutx corresponding to this current IBx is also smaller than upper limit Wout0 of the discharge power at this temperature TB2 (point P29 in FIG. 7).

Thus, in the case where the system voltage that enables maximum rotational speed Ngmax to be achieved in response to required torque command value TRtag2 is VHx, inverter temperature TW as well as temperature TB of the power storage device at this time are taken into consideration to restrict the electric power that can be output from the power storage device to Woutx when electric power Woutx that is output from the power storage device is smaller than upper limit Wout of the discharge power. In this way, the power performance can be ensured while the switching elements are protected.

Figure 8:
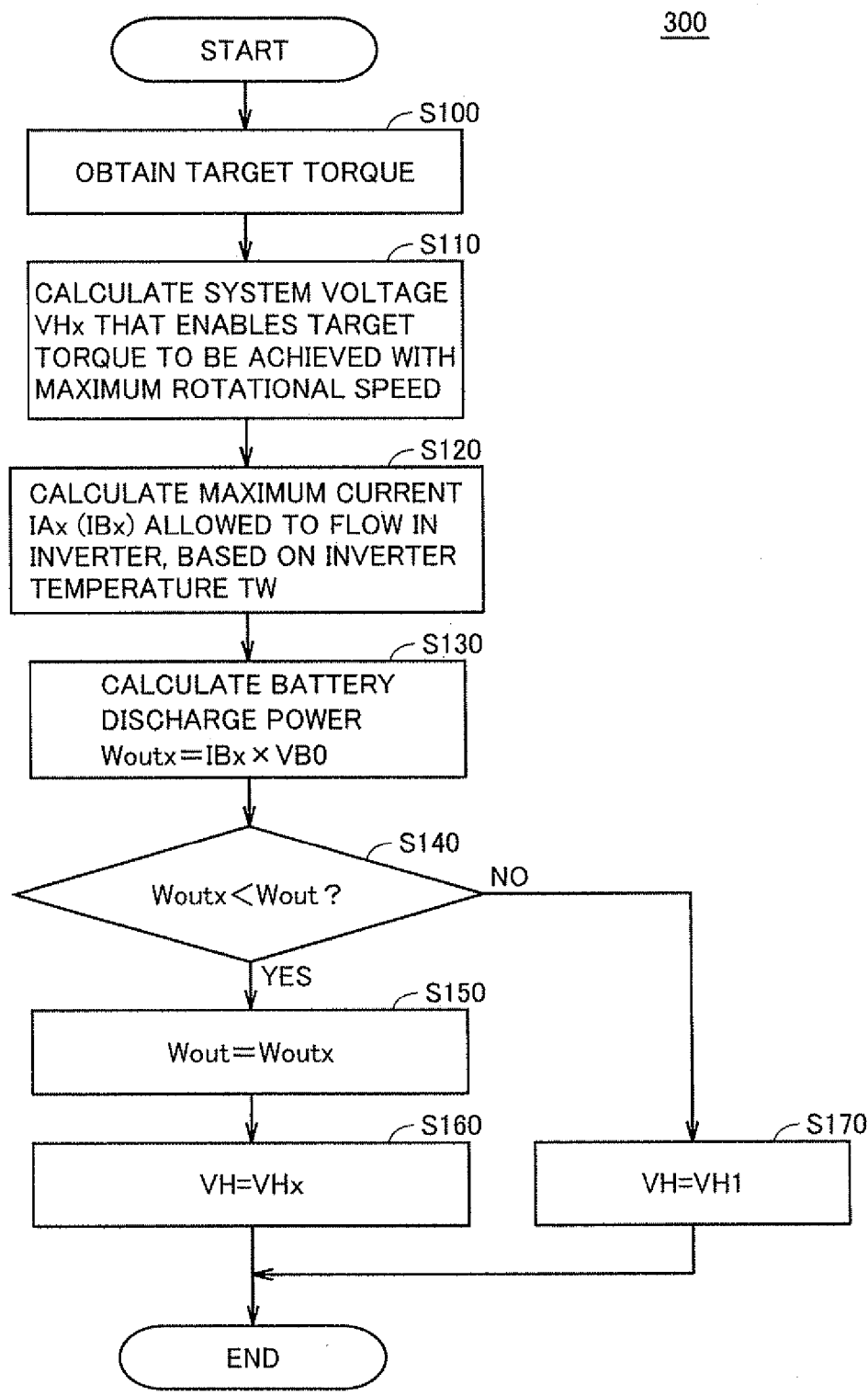
FIG. 8 is a flowchart for illustrating details of a voltage-setting control process executed by an ECU in the first embodiment.

FIG. 8 is a flowchart for illustrating details of a voltage-setting control process performed by ECU 300 in the first embodiment. Each step in the flowchart shown in FIG. 8 and the flowcharts shown in FIGS. 14 and 17 and described later herein is implemented by calling a program, which is stored in advance, from a main routine into ECU 300 and executing the program in predetermined cycles. Instead, regarding some of the steps, dedicated hardware (electronic circuitry) may be constructed to implement the steps.

Referring to FIGS. 1 and 8, in step (hereinafter "step" will be abbreviated as S) 100, ECU 300 obtains target torques TR1, TR2 of motor generators MG1, MG2 that are calculated based on driver's operation of the accelerator pedal, intake air temperature TAIR of engine 150, and atmospheric pressure PAIR for example.

Subsequently, in S110, ECU 300 uses a map or the like that is stored in advance like the one shown in FIG. 5 to calculate system voltage VHx that enables the obtained target torques TR1, TR2 to be achieved with the maximum rotational speed, for each of motor generators MG1, MG2.

ECU 300 in S120 calculates, based on a map like the one shown in FIG. 6, maximum current IAx that is allowed to flow in inverters 131, 135 when the calculated system voltage is VHx at inverter temperatures TW1, TW2. ECU 300 also calculates in S120 current IBx flowing in power storage device 110 that corresponds to current IAx.

Subsequently, ECU 300 in S130 calculates discharge power Woutx from power storage device 110, based on current IBx and lower limit VB0 of the voltage of power storage device 110.

In S140, ECU 300 determines whether or not discharge power Woutx calculated in S130 based on the map shown in FIG. 7 is smaller than upper limit Wout of the discharge power at current temperature TB of power storage device 110.

When discharge power Woutx is smaller than upper limit Wout of the discharge power (YES in S140), the process proceeds to S150 and ECU 300 sets the value of upper limit Wout of the discharge power to Woutx and sets the value of system voltage VH to VHx (S160). After this, the process returns to the main routine in which the set upper limit (=Woutx) of the discharge power and system voltage (=VHx) are used to generate control signals PWC, PWI1, PWI2 for converter 120 and inverters 131, 135.

In contrast, when discharge power Woutx is equal to or larger than upper limit Wout of the discharge power (NO in S140), ECU 300 maintains the value of upper limit Wout of the discharge power. Then, the process proceeds to S170 in which ECU 300 sets the value of system voltage VH to system voltage VH1 by which the current generated when the discharge power has a maximum value (namely Wout) is allowed to flow in the inverter. After this, the process returns to the main routine in which the upper limit (=Wout) of the discharge power and the system voltage (=VH1) are used to generate control signals PWC, PWI1, PWI2 for converter 120 and inverters 131, 135.

Control is thus performed following the above-described process. Therefore, even at low temperatures, when the electric power that is necessary to output a required torque command value with the maximum rotational speed is smaller than the upper limit of the discharge power of the power storage device, the discharge power from the power storage device can be restricted based on respective temperatures of the inverter and the power storage device, to thereby reduce the decrease of system voltage VH. Accordingly, system voltage VH can be reduced without limiting the rotational speed, and therefore, deterioration of the vehicle's power performance can be suppressed while the switching elements are protected.

While how to set system voltage VH using separate maps as shown in FIGS. 5 to 7 has been explained with reference to FIG. 8, system voltage VH may also be set using a multidimensional map including the characteristics of FIGS. 5 to 7 and using, as parameters, respective temperatures of the inverter and the power storage device, the required torque command value, and the maximum rotational speed.

Moreover, while the description above has been given of the case where the motor generators are operating in the power-running mode, the above-described scheme is also applicable to the case where the motor generators are operating in the regenerative braking mode.

As described above, in the present embodiment, motor generator MG1 functions as an electric generator driven by engine 150 to generate electric power. Power split device 140 including the planetary gear train adjusts the torques generated by engine 150 and motor generators MG1, MG2 so that they are balanced.

Figure 9:
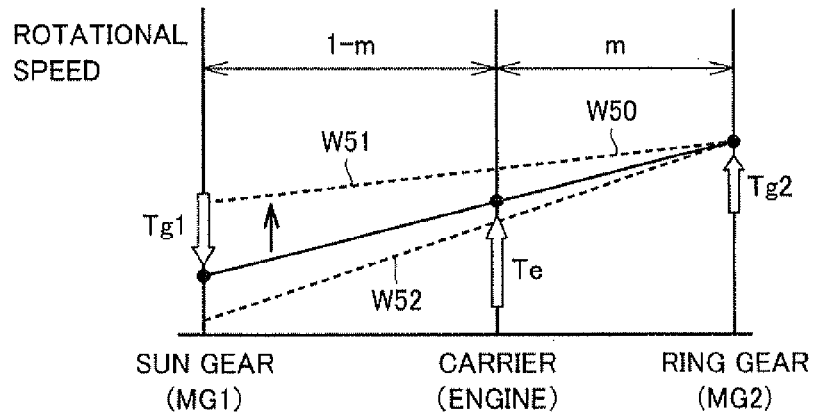
FIG. 9 is a nomographic chart showing a relation between respective torques generated by an engine and motor generators.

FIG. 9 is a nomographic chart showing a relation between respective torques generated by engine 150 and motor generators MG1, MG2. The vertical axis of the nomographic chart represents the rotational speed.

Referring to FIG. 9, a case will be considered where motor generator MG1 is connected to the sun gear of the planetary gear train included in power split device 140, engine 150 is connected to the carrier thereof, and motor generator MG2 is connected to the ring gear thereof. In this case, adjustments are made based on a ratio m (0<m<1) defining the reduction ratio, so that torque Te that is output by engine 150 and torque Tg2 that is output by motor generator MG2 are balanced with torque Mg1 generated by motor generator MG1 (line W50 in FIG. 9).

It is supposed for the sake of facilitating understanding that respective output torques of engine 150 and motor generator MG2 are constant. When the temperature decreases and accordingly system voltage VH is reduced, the torque by power generation of motor generator MG1 decreases for example from a point P50 to a point P51 in FIG. 10. Consequently, referring to FIG. 9, the balance between the torque of motor generator MG1 and respective output torques of engine 150 and motor generator MG2 is lost, and the rotational speeds of engine 150 and motor generator MG1 increase as indicated by a broken line W51 in FIG. 9 for example.

Figure 10:
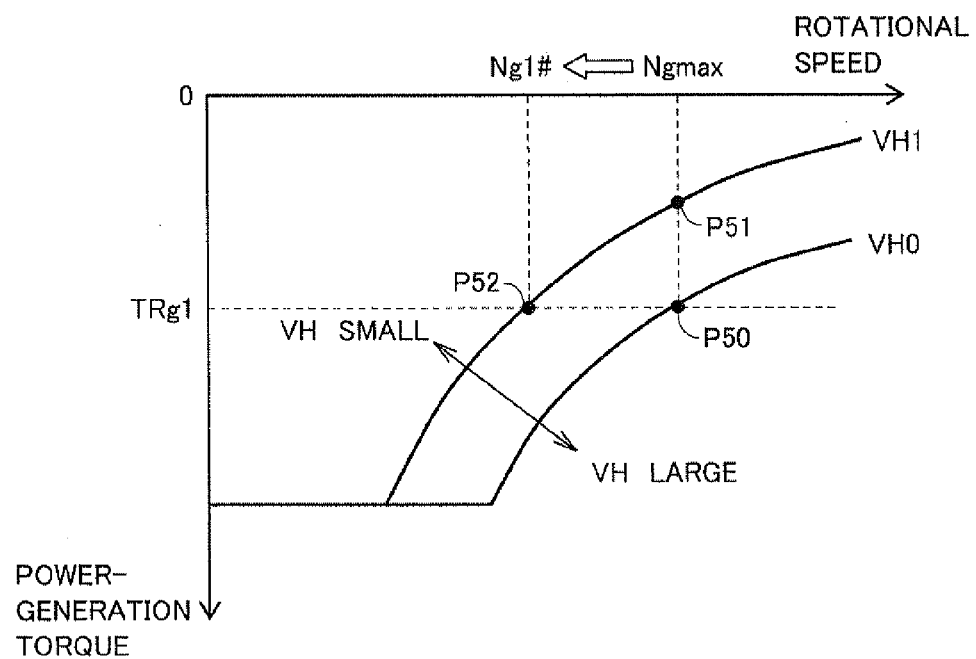
FIG. 10 is a diagram for illustrating voltage-setting control in the case where the motor generator generates electric power.

In order to prevent this increase of the rotational speed and output the same torque as the torque by power generation of motor generator MG1 at point P50, it is necessary to restrict the rotational speed of motor generator MG1 to reach a point P52 in FIG. 10. This state is indicated by a line W52 in the nomographic chart of FIG. 9 where the rotational speed of engine 150 decreases.

Thus, even in the case of the torque by power generation of motor generator MG1, a similar problem to the one explained in connection with FIG. 2 occurs. Therefore, the above-described voltage-setting control can be applied to protect the switching elements and also suppress deterioration of the vehicle's power performance. Here, when the power storage device is charged, the determination is made using an upper limit of the charge power instead of the above-described upper limit of the discharge power.

In the case of the vehicle as shown in FIG. 1 having motor generator MG2 for generating a drive force for the vehicle and motor generator MG1 for generating electric power, the electric power that is output from power storage device 110 is equal to a difference determined by subtracting the electric power generated by motor generator MG1 from the electric power that is required for generating the drive force by motor generator MG2. It should therefore be noted that, regarding the comparison with upper limit Wout of the discharge power of power storage device 110 in FIGS. 7 and 8, the comparison is made based on the electric power determined by subtracting the electric power generated by motor generator MG1 from the electric power that is necessary for generating a drive force by motor generator MG2.

Second Embodiment

As to the first embodiment, the description has been given of how to relax restriction of the system voltage, when the output electric power for achieving the required torque command value with the maximum rotational speed is smaller than the upper limit of the discharge power of the power storage device.

Under low-temperature conditions in which the temperature of the inverter decreases for example, the temperature of the power storage device also decreases in most cases. Therefore, under the condition where the electric power that can be output from the power storage device (upper limit of the discharge power) is restricted like the case where the temperature of the power storage device is lower than threshold value TB1 in FIG. 4, the maximum current that can be output from the power storage device is also restricted. Accordingly, the current flowing in the inverter is also decreased. In this case, therefore, restriction of system voltage VH may possibly be relaxed, as compared with the case where it is assumed that the maximum current that can be output from the power storage device is IB0 regardless of the temperature of the power storage device.

Accordingly, in connection with a second embodiment, a description will be given of how to set the system voltage based on the restricted value of the discharge power corresponding to the temperature of the power storage device.

Figure 11:
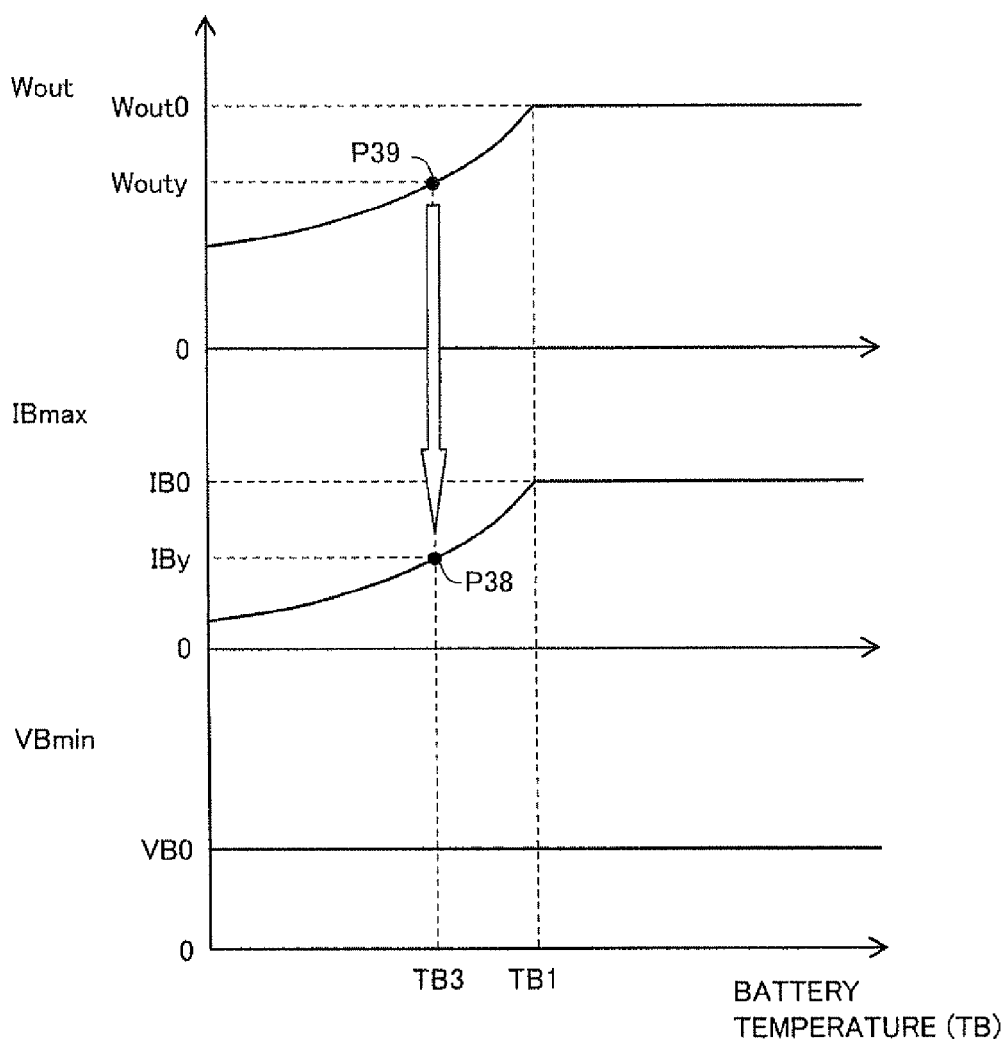
FIG. 11 is a first diagram for illustrating voltage-setting control in a second embodiment.
Figure 12:
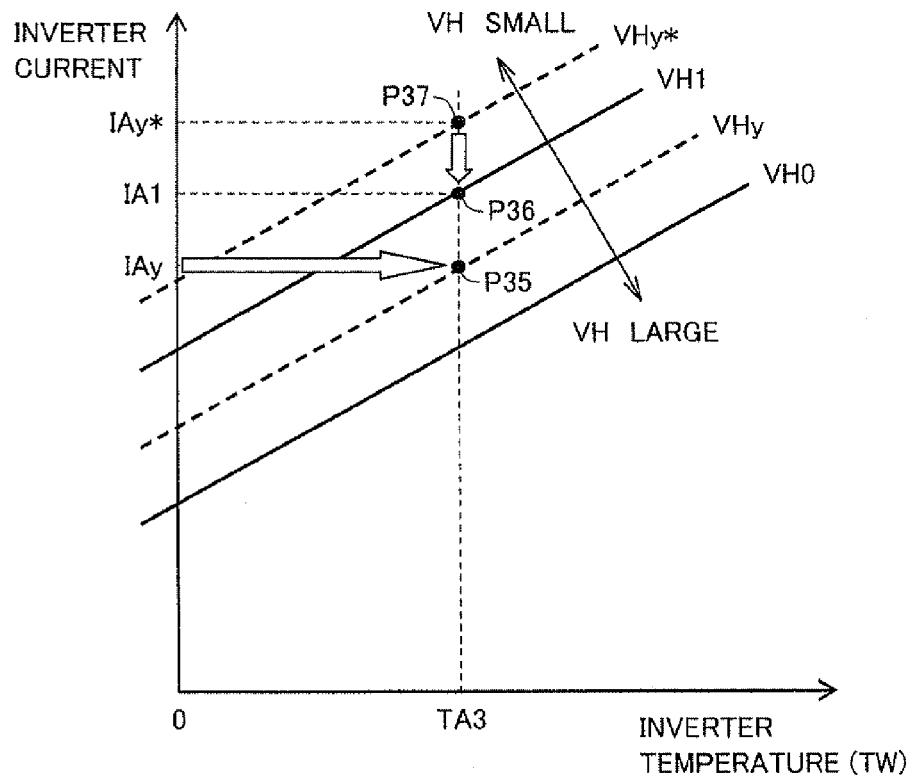
FIG. 12 is a second diagram for illustrating voltage-setting control in the second embodiment.
Figure 13:
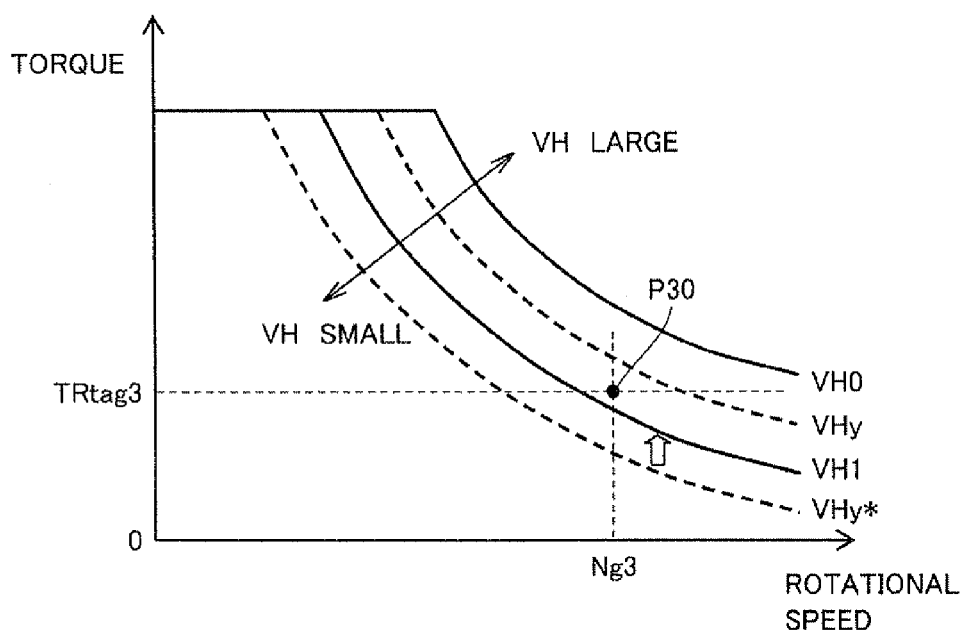
FIG. 13 is a third diagram for illustrating voltage-setting control in the second embodiment.

FIGS. 11 to 13 are diagrams for illustrating voltage-setting control in the second embodiment.

Referring to FIG. 11, in the second embodiment, upper limit Wout of the discharge power of the power storage device at current temperature TB of the power storage device is calculated. For example, in the case where the temperature is TB3 in FIG. 11, a point P39 at which the value of upper limit Wout of the discharge power is Wouty is calculated.

Then, maximum current IBmax (IBy) (point P38 in FIG. 11) that can be output from the power storage device at this time is calculated from Wouty and lower limit voltage VB0 of the power storage device.

Referring next to FIG. 12, maximum system voltage VHy (point P35 in FIG. 12) is calculated that enables inverter current IAy to flow corresponding to maximum current IBy calculated as described above, at current inverter temperature TW (=TA3).

In this way, system voltage VH is set. Accordingly, in FIG. 13 for example where the required torque command value is TRtag3 and the target rotational speed is Ng3 (point P30 in FIG. 13), it is unnecessary to restrict the rotational speed, contrary to the case like the above-described comparative example where the system voltage is set to VH1. Consequently, deterioration of the power performance can be suppressed.

It should be noted that, referring to FIG. 12, in the case for example where the inverter current is IAy*, system voltage VHy* calculated accordingly is smaller than VH1 (point P37 in FIG. 12). Thus, system voltage VH is restricted to more than a required extent. In such a case, the system voltage is therefore set to VH1.

The voltage-setting control in the second embodiment is effective in the case where upper limit Wout of the discharge power of the power storage device is set smaller than maximum value Wout0 as seen from FIG. 11.

Figure 14:
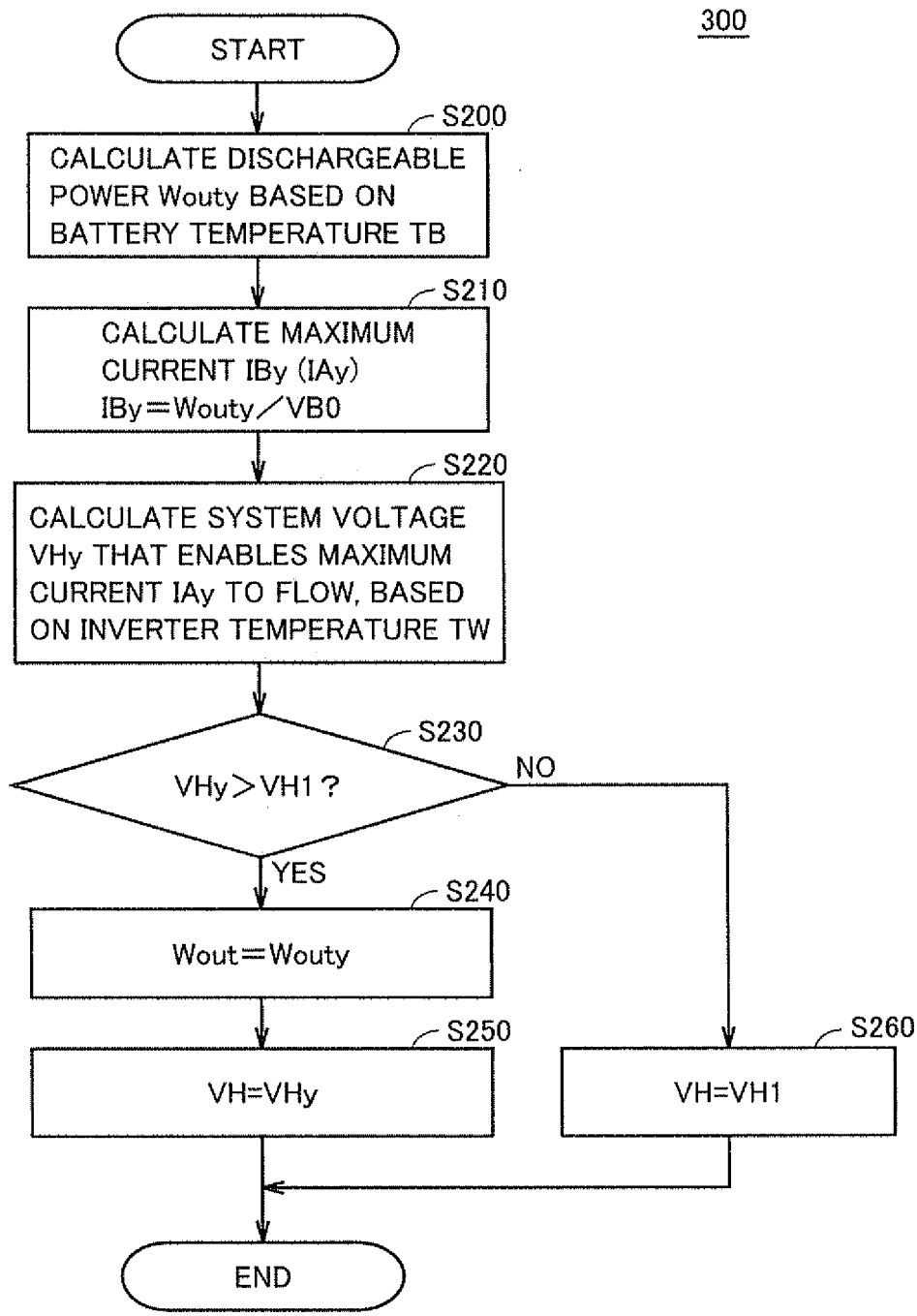
FIG. 14 is a flowchart for illustrating details of a voltage-setting control process executed by an ECU in the second embodiment.

FIG. 14 is a flowchart for illustrating details of a voltage-setting control process executed by ECU 300.

Referring to FIGS. 1 and 14, ECU 300 in S200 calculates upper limit Wout (=Wouty) of the discharge power of power storage device 110 based on current temperature TB of power storage device 110, using a map as shown in FIG. 11.

Next, in s210, ECU 300 calculates maximum current IBy that can be output from power storage device 110, based on discharge power's upper limit Wouty calculated in S200 and lower limit voltage VB0 of power storage device 110. ECU 300 also calculates inverter current IAy corresponding to this maximum current IBy.

In S220, ECU 300 calculates maximum system voltage VHy that enables inverter current IAy calculated as described above to flow, using a map as shown in FIG. 12. ECU 300 then determines in S230 whether or not calculated system voltage VHy is larger than system voltage VH1 corresponding to the case where the value of discharge power's upper limit Wout of power storage device 110 is maximum value Wout0.

When system voltage VHy is larger than VH1 (YES in S230), the process proceeds to S240 in which the value of discharge power's upper limit Wout is set to Wouty and, in S250, the value of system voltage VH is set to VHy. After this, the process returns to the main routine in which the set discharge power's upper limit (=Wouty) and system voltage (=VHy) are used to generate control signals PWC, PWI1, PWI2 for converter 120 and inverters 131, 135.

In contrast, when system voltage VHy is VH1 or less (NO in S230), ECU 300 keeps the value of discharge power's upper limit Wout. The process then proceeds to S260 in which ECU 300 sets the value of system voltage VH to system voltage VH1 that enables current to flow in the inverter that is generated when the discharge power is maximum (namely Wout). After this, the process returns to the main routine in which the discharge power's upper limit (=Wont) and the system voltage (=VH1) are used to generate control signals PWC, PWI1, PWI2 for converter 120 and inverters 131, 135.

In the second embodiment, a multidimensional map including the characteristics in FIGS. 11 to 13 may also be used to set system voltage VH.

Control is thus carried out following the above-described process and therefore, in the case where the discharge power's upper limit of the power storage device is restricted by the temperature of the power storage device, the inverter current is accordingly restricted. This control can therefore be performed to reduce the decrease of the system voltage. In this way, deterioration of the power performance of the vehicle can be suppressed while the switching elements are protected.

Third Embodiment

As to the second embodiment, the description has been given of how to set the system voltage based on the discharge power's upper limit that is determined depending on the temperature of the power storage device. In the second embodiment, however, if the electric power that is actually required is smaller than the discharge power's upper limit, the system voltage could excessively be restricted.

Thus, in connection with a third embodiment, a description will be given of how to set the system voltage based on a comparison of the required electric power determined by the torque command value and the target rotational speed, with the discharge power's upper limit, at a certain temperature of the power storage device.

Figure 15:
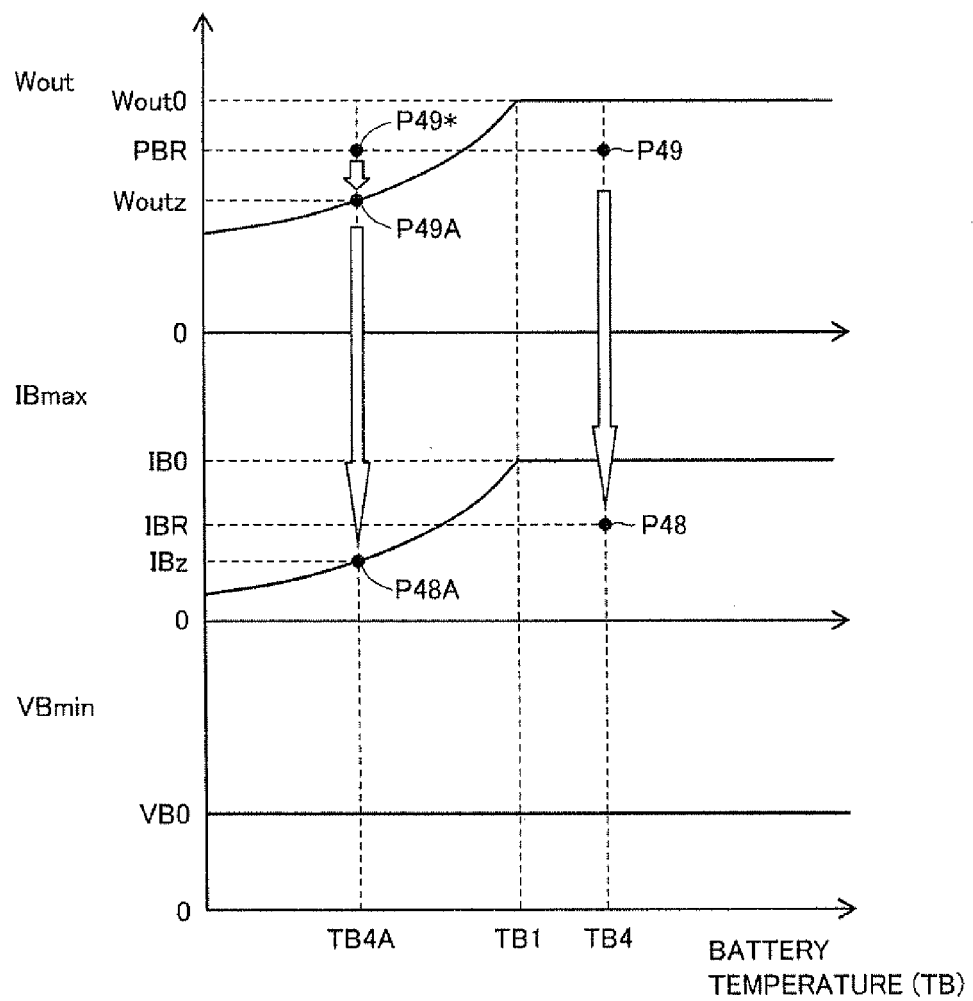
FIG. 15 is a first diagram for illustrating voltage-setting control in a third embodiment.
Figure 16:
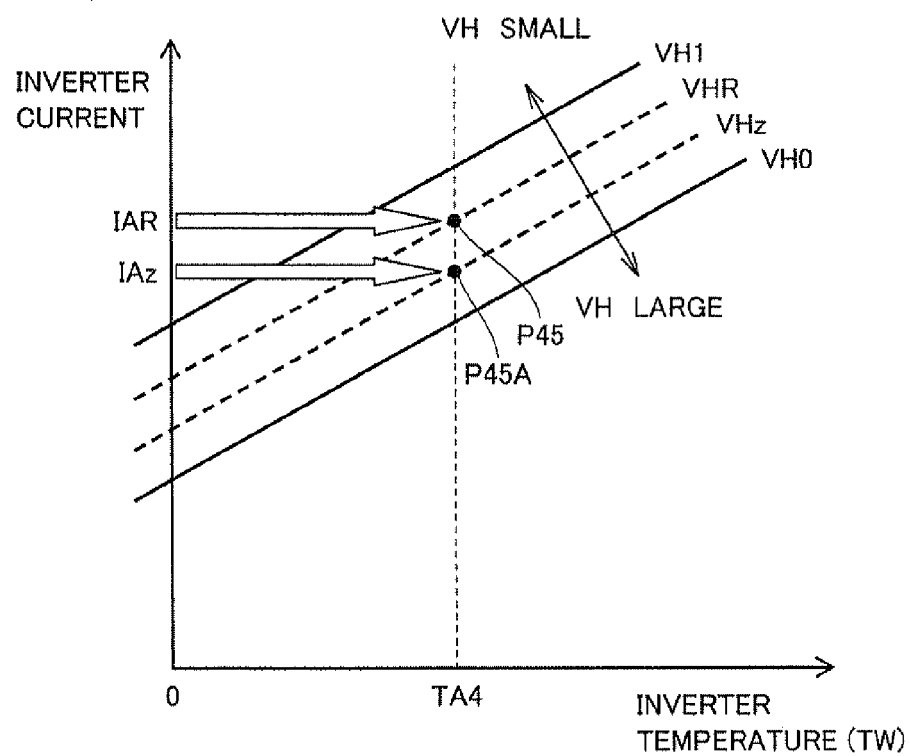
FIG. 16 is a second diagram for illustrating voltage-setting control in the third embodiment.

FIGS. 15 and 16 are each a diagram for illustrating voltage-setting control in the third embodiment.

Referring to FIG. 15, it is supposed here that current temperature TB of the power storage device is TB4 for example and the required electric power is PBR (point P49 in FIG. 15). In this case, as seen from FIG. 15, required electric power PBR is smaller than discharge power's upper limit Wout0 at temperature TB4. Maximum current IBR that can be output from the power storage device at this time is also smaller than maximum value IB0 at this temperature TB4 (point P48 in FIG. 15).

Then, as shown in FIG. 16, maximum system voltage VHR (point P45 in FIG. 16) that enables inverter current IAR corresponding to this current IBR to flow at inverter temperature TW (=TA4) is calculated.

In contrast, when the temperature of the power storage device is still lower such as TB4A shown in FIG. 15 for example, required electric power PBR (point P45 in FIG. 15) is larger than discharge power's upper limit Woutz at temperature TB4A. In this case, in order to prevent overdischarge of the power storage device, the required electric power is restricted to Woutz (point P49A in FIG. 15). Subsequently, in a similar manner to the second embodiment, maximum current IBz is calculated and system voltage VHz that enables corresponding inverter current IAz to flow is calculated as illustrated in FIG. 16.

Specifically, when required electric power PBR is smaller than discharge power's upper limit Wout, required electric power PBR is used to restrict the discharge power as done in the first embodiment, so that the decrease of the system voltage can be reduced. In contrast, when required electric power PBR is larger than discharge power's upper limit Wout, the discharge power can be restricted using the discharge power's upper limit as done in the second embodiment, to thereby reduce the decrease of the system voltage while avoiding overdischarge.

Figure 17:
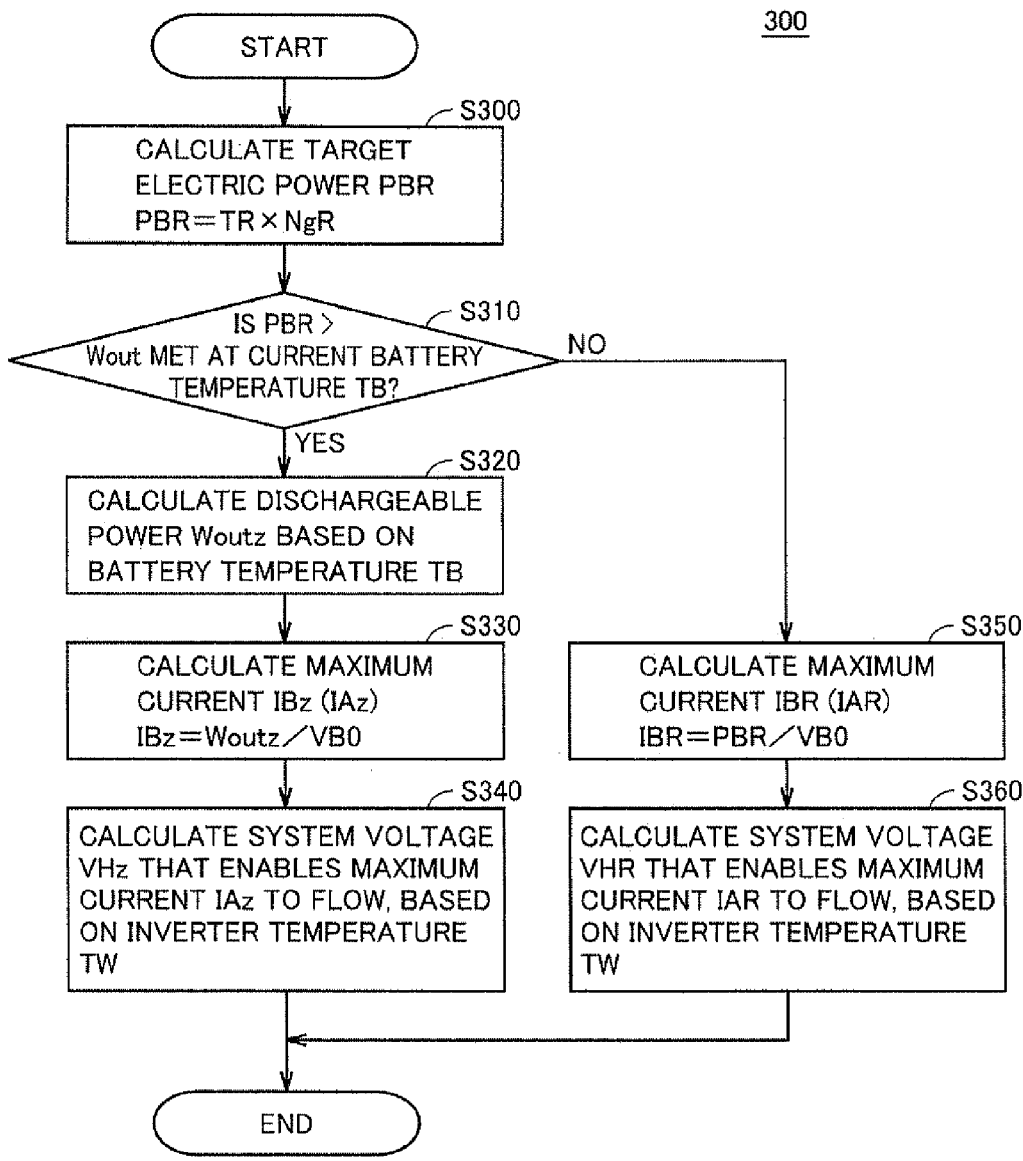
FIG. 17 is a flowchart for illustrating details of a voltage-setting control process executed by an ECU in the third embodiment.

FIG. 17 is a flowchart for illustrating details of a voltage-setting control process executed by ECU 300.

Referring to FIGS. 1 and 17, ECU 300 in S300 calculates target electric power PBR, based on torque command value TR and target rotational speed NgR.

Then, ECU 300 in S310 determines whether or not the calculated target electric power PBR is larger than discharge power's upper limit Wout at current temperature TB of the power storage device.

When target electric power PBR is equal to or smaller than discharge power's upper limit Wout (NO in S310), the process proceeds to S350 in which ECU 300 calculates maximum current IBR of power storage device 110, from target electric power PBR and lower limit VB0 of the voltage of power storage device 110. ECU 300 also calculates inverter current IAR corresponding to this current IBR.

Then, ECU 300 in S360 calculates system voltage VHR that enables above-described current IAR to flow at current temperature TW of the inverter. After this, the process returns to the main routine in which target electric power PBR and system voltage VHR are used to generate control signals PWC, PWI1, PWI2 for converter 120 and inverters 131, 135.

In contrast, when target electric power PBR is larger than discharge power's upper limit Wout (YES in S310), the process proceeds to S320. ECU 300 then calculates discharge power's upper limit Woutz at current temperature TB of power storage device 110, using a map like the one shown in FIG. 15.

Next, ECU 300 in S330 calculates maximum current IBz of power storage device 110, from dischargeable power Woutz and voltage's lower limit VB0 of power storage device 110. ECU 300 also calculates inverter current IAz corresponding to this current IBz.

Then, ECU 300 in S340 calculates system voltage VHz that enables above-described current IAz to flow at current inverter temperature TW. After this, the process returns to the main routine in which the discharge power's upper limit (=Woutz) and the system voltage (=VHz) are used to generate control signals PWC, PWI1, PWI2 for converter 120 and inverters 131, 135.

In the third embodiment as well, the required electric power, the temperature of the power storage device, and the temperature of the inverter may be used as parameters and a multidimensional map including the characteristics in FIGS. 15 and 16 may be used to set system voltage VH.

The control can be carried out following the above-described process to set the system voltage based on the actual required electric power, in consideration of respective temperatures of the power storage device and the inverter. In this way, deterioration of the vehicle's power performance can be suppressed while the switching elements are protected.

In the second and third embodiments as well, the above-described voltage-setting control processes may be applied to power storage device 110 in the charging state.

It should be construed that embodiments disclosed herein are given by way of illustration in all respects, not by way of limitation. It is intended that the scope of the present invention is defined by claims, not by the above description, and encompasses all modifications and variations equivalent in meaning and scope to the claims.

REFERENCE SIGNS LIST 10, 13 voltage sensor; 11, 23, 28, 29 temperature sensor; 12, 24, 25 current sensor; 20 DC voltage generation unit; 22 atmospheric pressure sensor; 26, 27 rotational angle sensor; 30 load device; 100 vehicle; 110 power storage device; 120 converter; 130, 131, 135 inverter; 132 U phase upper-lower arm; 133 V phase upper-lower arm; 134 W phase upper-lower arm; 140 power split device; 150 engine; 160 drive wheel; 300 ECU; C1, C2 capacitor; D1-D8 diode; L1 reactor; MG1, MG2 motor generator; NL ground line; PL1, PL2 electric power line; Q1-Q8 switching element; SR1, SR2 system relay

The invention claimed is:
1. A vehicle comprising:
a power storage device;
a rotating electric machine;
a converter for stepping up an output voltage from said power storage device;
an inverter including a switching element for converting the stepped-up voltage from said converter to drive said rotating electric machine; and
a control device for setting said stepped-up voltage,
said switching element having a characteristic that a withstand voltage of said switching element decreases as a temperature of said inverter decreases,
said control device setting said stepped-up voltage, based on a temperature characteristic of said power storage device and a temperature characteristic of said inverter, so that said stepped-up voltage is increased within a range in which said stepped-up voltage does not exceed said withstand voltage, wherein the temperature characteristic of said power storage device includes a characteristic that a maximum current that said power storage device can output decreases as the temperature of said power storage device decreases, and said control device setting said stepped-up voltage, based on a temperature of said power storage device, a temperature of said inverter, a target torque command value for said rotating electric machine, and a maximum rotational speed of said rotating electric machine.

2. The vehicle according to claim 1, wherein said control device sets said stepped-up voltage, based on the temperature of said power storage device and the temperature of said inverter, by further restricting an upper limit of charge and discharge electric power of said power storage device, so that said maximum rotational speed is achieved for said target torque command value.

3. The vehicle according to claim 2, wherein when said stepped-up voltage enables said maximum rotational speed to be achieved for said target torque command value, said control device calculates chargeable and dischargeable electric power of said power storage device, based on a maximum current allowed to flow in said inverter at a current temperature of said inverter, and when a maximum electric power that can be input and output to and from said power storage device at a current temperature of said power storage device is larger than said chargeable and dischargeable electric power, said control device sets said chargeable and dischargeable electric power to said upper limit of charge and discharge electric power and, when said maximum electric power is smaller than said chargeable and dischargeable electric power, said control device sets said maximum electric power to said upper limit of charge and discharge electric power.

4. The vehicle according to claim 1, wherein the temperature characteristic of said inverter includes a characteristic that current allowed to flow in said inverter is larger as the temperature of said inverter is higher and is smaller as said stepped-up voltage is larger.

5. The vehicle according to claim 1, wherein the temperature characteristic of said inverter includes a characteristic that current allowed to flow in said inverter is larger as the temperature of said inverter is higher and is smaller as said stepped-up voltage is larger.

6. A vehicle comprising:

a power storage device;

a rotating electric machine;

a converter for stepping up an output voltage from said power storage device;

an inverter including a switching element for converting the stepped-up voltage from said converter to drive said rotating electric machine; and a control device for setting said stepped-up voltage, said switching element having a characteristic that a withstand voltage of said switching element decreases as a temperature of said inverter decreases, said control device setting said stepped-up voltage, based on a temperature characteristic of said power storage device and a temperature characteristic of said inverter, so that said stepped-up voltage is increased within a range in which said stepped-up voltage does not exceed said withstand voltage, wherein the temperature characteristic of said power storage device includes a characteristic that a maximum current that said power storage device can output decreases as the temperature of said power storage device decreases, and said control device setting said stepped-up voltage to a maximum stepped-up voltage that enables an inverter current corresponding to a maximum current that can be input and output to and from said power storage device to flow at a current temperature of said inverter.

7. A vehicle comprising:

a power storage device;

a rotating electric machine;

a converter for stepping up an output voltage from said power storage device;

an inverter including a switching element for converting the stepped-up voltage from said converter to drive said rotating electric machine; and a control device for setting said stepped-up voltage, said switching element having a characteristic that a withstand voltage of said switching element decreases as a temperature of said inverter decreases, said control device setting said stepped-up voltage, based on a temperature characteristic of said power storage device and a temperature characteristic of said inverter, so that said stepped-up voltage is increased within a range in which said stepped-up voltage does not exceed said withstand voltage, wherein the temperature characteristic of said power storage device includes a characteristic that a maximum current that said power storage device can output decreases as the temperature of said power storage device decreases, and said control device setting said stepped-up voltage based on a temperature of said power storage device, a temperature of said inverter, and a target electric power required by said rotating electric machine.

8. The vehicle according to claim 7, wherein said control device compares said target electric power with a maximum electric power that can be input and output to and from said power storage device at a current temperature of said power storage device, and when said target electric power is larger than said maximum electric power, said control device sets said stepped-up voltage based on a maximum current that can be input and output to and from said power storage device when said maximum electric power is input and output to and from said power storage device and based on a temperature of said inverter and, when said target electric power is smaller than said maximum electric power, said control device sets said stepped-up voltage based on said target electric power and a temperature of said inverter.

9. The vehicle according to claim 8, wherein when said target electric power is larger than said maximum electric power, said control device sets said stepped-up voltage to a maximum stepped-up voltage that enables an inverter current corresponding to said maximum current to flow at a current temperature of said inverter and, when said target electric power is smaller than said maximum electric power, said control device sets said stepped-up voltage to a maximum stepped-up voltage that enables current, which flows in said inverter when said target electric power is input or output at a current temperature of said inverter, to flow.

* * * * *